US012686371B2

(12) United States Patent
Kaneko et al.

(10) Patent No.: US 12,686,371 B2
(45) Date of Patent: Jul. 21, 2026

(54) VEHICLE CONTROL DEVICE, VEHICLE CONTROL METHOD, AND VEHICLE CONTROL SYSTEM

(71) Applicant: Hitachi Astemo, Ltd., Hitachinaka (JP)

(72) Inventors: Satoshi Kaneko, Hitachinaka (JP); Keisuke Suzuki, Hitachinaka (JP); Naoki Shinohara, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 96 days.

(21) Appl. No.: 18/024,608

(22) PCT Filed: Aug. 19, 2021

(86) PCT No.: PCT/JP2021/030350
§ 371 (c)(1),
(2) Date: Mar. 3, 2023

(87) PCT Pub. No.: WO2022/070658
PCT Pub. Date: Apr. 7, 2022

(65) Prior Publication Data
US 2023/0322195 A1      Oct. 12, 2023

(30) Foreign Application Priority Data

Sep. 30, 2020    (JP) ................................. 2020-164411

(51) Int. Cl.
*B60T 8/58*                (2006.01)
(52) U.S. Cl.
CPC ............. *B60T 8/58* (2013.01); *B60T 2210/10* (2013.01); *B60T 2250/04* (2013.01)

(58) Field of Classification Search
None
See application file for complete search history.

(56) References Cited

U.S. PATENT DOCUMENTS

| | | | | |
|---|---|---|---|---|
| 9,956,960 B2 * | 5/2018 | Komatsu | ......... | B60W 30/18127 |
| 10,195,945 B2 * | 2/2019 | Hirakawa | ............. | B60W 10/18 |
| 10,300,795 B2 * | 5/2019 | Sawada | ..................... | B60L 7/18 |

(Continued)

FOREIGN PATENT DOCUMENTS

| | | | | |
|---|---|---|---|---|
| BR | 112017015719 B1 * | 9/2022 | ............ | B60T 13/586 |
| BR | 112019015230 B1 * | 3/2024 | | |

(Continued)

OTHER PUBLICATIONS

International Search Report issued Sep. 21, 2021 in International (PCT) Application No. PCT/JP2021/030350, with English translation.

(Continued)

*Primary Examiner* — Kevin R Steckbauer
(74) *Attorney, Agent, or Firm* — Wenderoth, Lind & Ponack, L.L.P.

(57) ABSTRACT

A vehicle control device, a vehicle control method, and a vehicle control system are configured to: (i) acquire a first physical quantity relating to a speed of a vehicle and a second physical quantity relating to a requested braking force required to decelerate the vehicle; and (ii) generate a driving force by a motor under a state in which a friction braking force is being generated when the vehicle is to be decelerated based on the second physical quantity.

13 Claims, 11 Drawing Sheets

(56) References Cited

U.S. PATENT DOCUMENTS

| | | | | | |
|---|---|---|---|---|---|
| 10,328,803 | B2 * | 6/2019 | Komatsu | | B60L 7/10 |
| 10,343,684 | B2 * | 7/2019 | Geller | | B60W 10/184 |
| 10,710,463 | B2 * | 7/2020 | Sawada | | B60L 15/2072 |
| 11,027,617 | B2 * | 6/2021 | Shindo | | B60L 9/18 |
| 12,084,058 | B2 * | 9/2024 | Kaneko | | B60W 30/143 |
| 2007/0018499 | A1 * | 1/2007 | Kokubo | | B60L 7/14 |
| | | | | | 303/151 |
| 2009/0102145 | A1 * | 4/2009 | Moriki | | B60K 6/44 |
| | | | | | 280/5.507 |
| 2013/0116874 | A1 | 5/2013 | Ichinose et al. | | |
| 2013/0197731 | A1 * | 8/2013 | Schum | | B60L 15/2063 |
| | | | | | 701/22 |
| 2014/0379190 | A1 * | 12/2014 | Sawada | | B60L 7/14 |
| | | | | | 701/22 |
| 2016/0159225 | A1 * | 6/2016 | Nakatsu | | B60L 15/2009 |
| | | | | | 701/70 |
| 2017/0113700 | A1 * | 4/2017 | Kaneko | | B60T 7/22 |
| 2017/0282925 | A1 * | 10/2017 | Geller | | B60T 8/3255 |
| 2018/0015925 | A1 * | 1/2018 | Komatsu | | B60T 13/588 |
| 2018/0141441 | A1 * | 5/2018 | Kim | | B60T 8/321 |
| 2018/0154797 | A1 * | 6/2018 | Sawada | | B60L 7/26 |
| 2018/0244157 | A1 * | 8/2018 | Hirakawa | | B60L 7/18 |
| 2018/0244158 | A1 * | 8/2018 | Komatsu | | B60W 30/18127 |
| 2019/0381895 | A1 * | 12/2019 | Shindo | | B60L 15/2081 |
| 2021/0001730 | A1 * | 1/2021 | Shindo | | B60L 15/20 |
| 2022/0063625 | A1 * | 3/2022 | Ozaki | | B60W 30/18018 |
| 2022/0063626 | A1 * | 3/2022 | Kaneko | | B60L 7/16 |
| 2022/0080942 | A1 | 3/2022 | Eberl et al. | | |
| 2023/0264664 | A1 * | 8/2023 | Maruyama | | B60T 17/22 |
| | | | | | 701/70 |
| 2023/0322195 | A1 * | 10/2023 | Kaneko | | B60T 8/58 |
| | | | | | 701/70 |
| 2024/0001775 | A1 * | 1/2024 | Oh | | B60L 15/2009 |
| 2024/0270220 | A1 * | 8/2024 | Heidl | | B60T 7/12 |
| 2024/0308354 | A1 * | 9/2024 | Shinohara | | B60W 30/18109 |

FOREIGN PATENT DOCUMENTS

| | | | | | |
|---|---|---|---|---|---|
| CN | 116194349 | A * | 5/2023 | | B60T 8/58 |
| DE | 102019103375 | | 8/2020 | | |
| EP | 2050642 | A2 * | 4/2009 | | B60W 10/08 |
| EP | 3168098 | A1 * | 5/2017 | | F16D 61/00 |
| EP | 3919312 | A1 * | 12/2021 | | B60W 30/18127 |
| EP | 3342625 | B1 * | 12/2022 | | B60L 7/18 |
| EP | 4223607 | A1 * | 8/2023 | | B60T 8/58 |
| JP | 2006-284414 | | 10/2006 | | |
| JP | 2007-30631 | | 2/2007 | | |
| JP | 2011-259645 | | 12/2011 | | |
| JP | 2013-179728 | | 9/2013 | | |
| JP | 2016-28913 | | 3/2016 | | |
| JP | WO2016120980 | A1 * | 11/2017 | | B60T 7/12 |
| JP | 2022056583 | A * | 4/2022 | | B60T 8/58 |
| JP | 2023008004 | A * | 1/2023 | | B60T 8/58 |
| JP | 2023021494 | A * | 2/2023 | | |
| JP | 2024034573 | A * | 3/2024 | | B60T 8/1755 |
| JP | 2024034574 | A * | 3/2024 | | B60T 8/1755 |
| JP | 2024034575 | A * | 3/2024 | | B60L 50/51 |
| JP | 7478638 | B2 * | 5/2024 | | B60T 8/172 |
| JP | 2024096188 | A * | 7/2024 | | B60W 30/025 |
| WO | WO-2016006687 | A1 * | 1/2016 | | F16D 1/00 |
| WO | WO-2020158145 | A1 * | 8/2020 | | B60W 30/18127 |
| WO | WO-2022070658 | A1 * | 4/2022 | | B60T 8/58 |
| WO | WO-2023281975 | A1 * | 1/2023 | | B60T 8/58 |
| WO | WO-2024048321 | A1 * | 3/2024 | | B60T 8/1755 |
| WO | WO-2024048322 | A1 * | 3/2024 | | B60T 8/1755 |
| WO | WO-2024048323 | A1 * | 3/2024 | | B60L 50/51 |

OTHER PUBLICATIONS

International Preliminary Report on Patentability issued Mar. 28, 2023 in International (PCT) Application No. PCT/JP2021/030350, with English translation.

Extended European Search Report issued Jun. 19, 2024 in corresponding European Patent Application No. 21874961.2.

* cited by examiner

Fig. 5
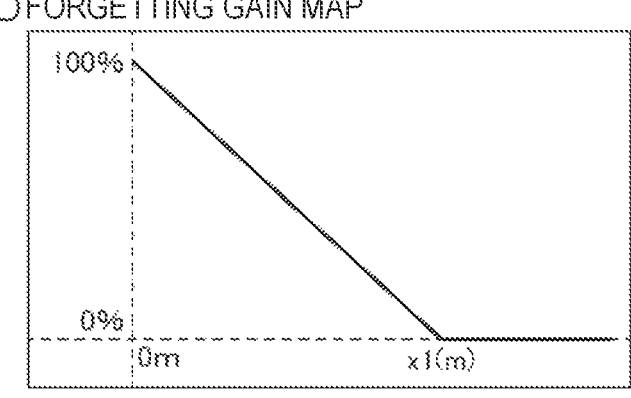
OPERATION OF VEHICLE DETERMINATION UNIT
Fig. 6
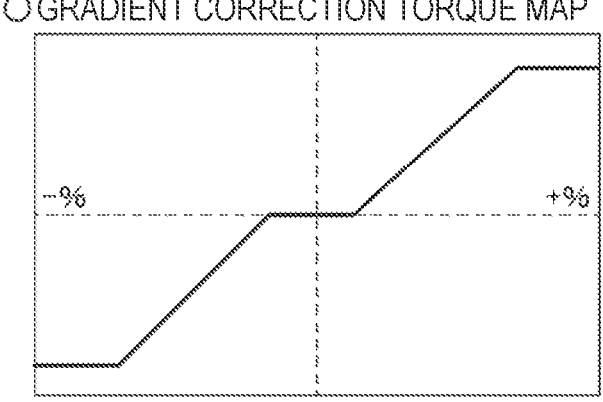
○FORGETTING GAIN MAP
Fig. 7
○GRADIENT CORRECTION TORQUE MAP

VEHICLE CONTROL DEVICE, VEHICLE CONTROL METHOD, AND VEHICLE CONTROL SYSTEM

CROSS-REFERENCE TO RELATED APPLICATION

The present application claims priority based on Japanese Patent Application No. 2020-164411 filed on Sep. 30, 2020. All disclosed contents including the Specification, the Scope of Claims, the Drawings, and the Abstract of Japanese Patent Application No. 2020-164411 are incorporated herein by reference in their entirety.

TECHNICAL FIELD

The present invention relates to a vehicle control device, a vehicle control method, and a vehicle control system.

BACKGROUND ART

In JP 2016-28913 A, there is disclosed a pitching vibration control device for a vehicle which sets, when a vehicle transitions from a deceleration state to a state in which a vehicle speed is zero, a vehicle speed for starting to reduce a torque so that a vehicle longitudinal acceleration is equal to or lower than a predetermined allowable value based on a regenerative braking force during regenerative braking, a final target value of a motor braking/driving force, and a predetermined decreasing gradient for reducing the regenerative braking force.

SUMMARY OF INVENTION

However, in JP 2016-28913 A, the regenerative braking force is reduced in accordance with the decrease in the vehicle speed, and hence, depending on an error in control based on estimation of the decreasing gradient of the regenerative braking force, there is a fear in that pitching fluctuation may occur when the vehicle stops.

Solution to Problem

One object of the present invention is to provide a vehicle control device, a vehicle control method, and a vehicle control system which are capable of suppressing pitching fluctuation at the time when a vehicle stops.

A vehicle control device, a vehicle control method, and a vehicle control system according to one embodiment of the present invention are configured to acquire a physical quantity relating to a speed of a vehicle and a physical quantity relating to a requested braking force required to decelerate the vehicle and to generate a driving force by a driving device under a state in which a friction braking force is being generated when the vehicle is to be decelerated based on the physical quantity relating to the requested braking force.

According to the one embodiment of the present invention, pitching fluctuation at the time when the vehicle stops can be suppressed.

BRIEF DESCRIPTION OF DRAWINGS

FIG. 5 is a graph for showing an operation of a vehicle stop determination unit in the first embodiment.

FIG. 6 is a forgetting gain map provided in a vehicle-stop-time information holding unit in the first embodiment.

FIG. 7 is a gradient correction torque map provided in the gradient resistance calculation unit in the first embodiment.

DESCRIPTION OF EMBODIMENTS

First Embodiment

Figure 1:
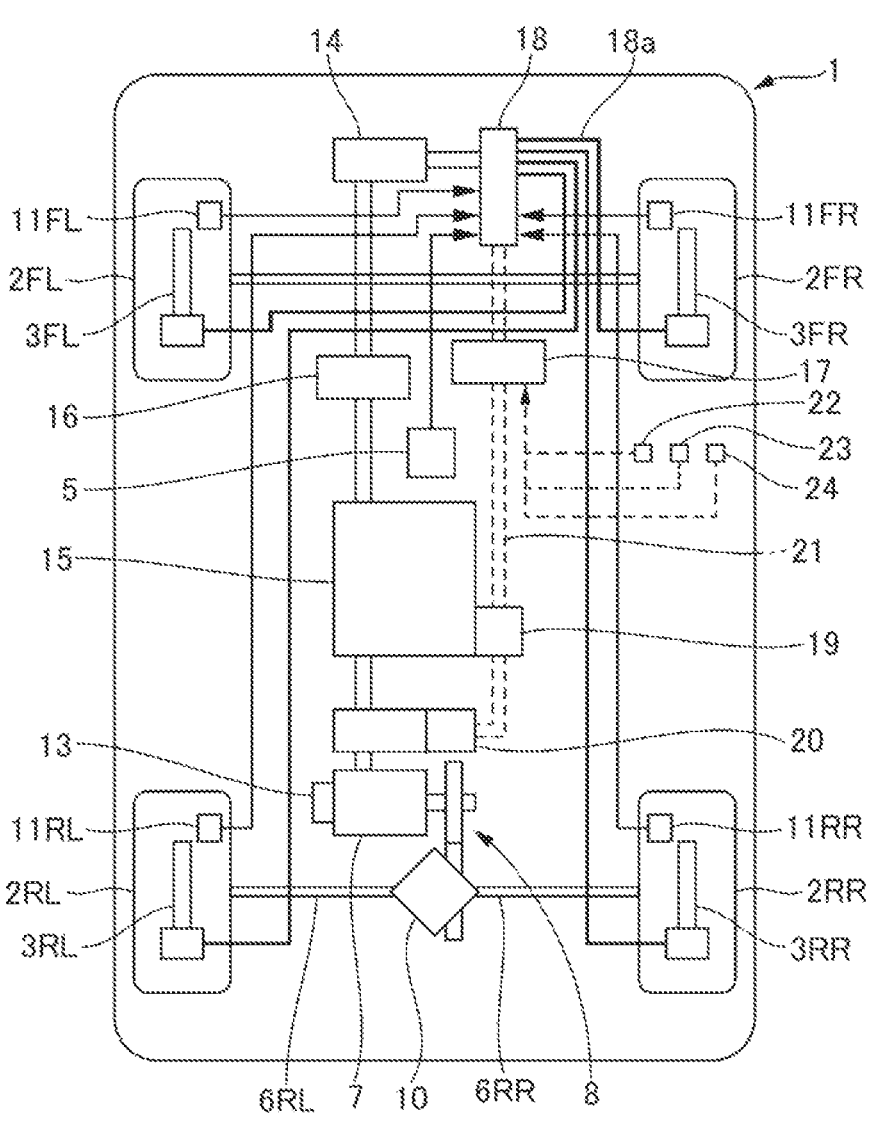
FIG. 1 is a configuration diagram of an electric vehicle control system according to a first embodiment of the present invention.

FIG. 1 is a configuration diagram of an electric vehicle control system according to a first embodiment of the present invention.

An electric vehicle 1 includes front wheels 2FL and 2FR, rear wheels 2RL and 2RR, and friction brakes 3FL, 3FR, 3RL, and 3RR (the friction brake for each wheel is hereinafter also generally referred to as "friction brake 3") each of which is provided to one of wheels, and generates a friction braking force on the wheel.

The electric vehicle 1 includes a rear motor (electric motor for rear wheels) 7 which outputs torques to the rear wheels 2RL and 2RR. The rear wheels 2RL and 2RR are also generally referred to as "driving wheels 2." A power transmission between the rear motor 7 and the rear wheels 2RL and 2RR is executed through a speed reducer 8, a differential 10, and rear axles 6RL and 6RR.

The wheels 2FL, 2FR, 2RL, and 2RR include wheel speed sensors 11FL, 11FR, 11RL, and 11RR which detect wheel speeds, respectively. The rear motor 7 includes a rear wheel resolver 13 which detects the motor rotation number. Moreover, the electric vehicle 1 includes an acceleration sensor 5 which detects an acceleration of the vehicle.

The friction brake 3 presses brake pads against a brake rotor which rotates integrally with each wheel in a rotation axis direction of the wheel, to thereby generate a braking force through use of a friction force. As the friction brake 3 in the first embodiment, description is given of a configuration in which the brake pads are pressed by a wheel cylinder operated through use of a brake hydraulic pressure, but the friction brake 3 may have such a configuration that the brake pads are pressed though use of a ball screw mechanism driven by an electric motor or the like, and is not particularly limited.

The electric vehicle 1 includes a low-voltage battery 14 and a high-voltage battery 15. The low-voltage battery 14 is, for example, a lead storage battery. The high-voltage battery 15 is, for example, a lithium ion battery or a nickel-hydrogen battery. The high-voltage battery 15 is charged by electric power boosted by a DC-DC converter 16.

The electric vehicle 1 includes a vehicle control device 17, a brake control device 18, a rear motor control device 20, and a battery control device 19. The respective control devices 17, 18, and 20 mutually share information through a CAN bus 21.

The vehicle control device 17 acquires information from various types of sensors such as the rear wheel resolver 13, an accelerator pedal sensor 22 which detects an accelerator operation amount, a brake sensor 23 which detects a brake operation amount, and a gear position sensor 24, to thereby execute integrated control for the vehicle. The vehicle control device 17 outputs a driver requested torque to be output by the rear motor 7 based on a requested distribution torque for a requested torque based on the accelerator operation and the brake operation by a driver and the like.

The brake control device 18 acquires information from various types of sensors such as the acceleration sensor 5 and wheel speed sensors 11, calculates a friction brake torque to be generated in each friction brake 3 based on the driver requested toque, generates a brake hydraulic pressure required for each wheel, and outputs the brake hydraulic pressure to each friction brake 3 through a hydraulic pipe 18a.

The battery control device 19 monitors a charge/discharge state of the high-voltage battery 15 and unit cells forming the high-voltage battery 15. The battery control device 19 calculates a battery requested torque limit value based on the charge/discharge state of the high-voltage battery 15 and the like. The battery requested torque limit value is the maximum torque allowed in the rear motor 7. For example, when a charging amount of the high-voltage battery 15 is becoming smaller, the battery requested torque limit value is to be set to a smaller value than a normal value.

The rear motor control device 20 controls electric power to be supplied to the rear motor 7 based on a rear requested torque.

Figure 2:
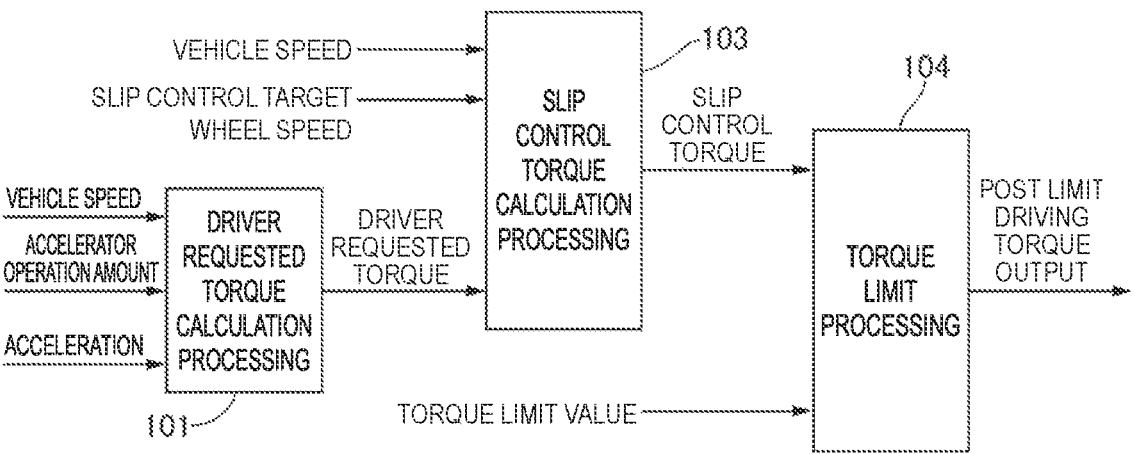
FIG. 2 is a control block diagram for illustrating driving torque calculation processing of a vehicle control device according to the first embodiment.

FIG. 2 is a control block diagram for illustrating driving torque calculation processing of the vehicle control device 17 according to the first embodiment.

A driver requested torque calculation processing unit 101 calculates a driver requested torque based on a vehicle speed, an accelerator operation amount, and an acceleration of the vehicle. The driver requested torque calculation processing unit 101 outputs a coast torque, which is a negative torque and simulates an engine brake force, when the driver has released the accelerator pedal and the vehicle speed is equal to or higher than a predetermined vehicle speed, and outputs a creep torque, which is a positive torque, when the vehicle speed is in a low vehicle speed range. Details of the calculation in this processing unit are described later. As the vehicle speed, an estimated vehicle speed is calculated from rotation number information on the rear motor 7 acquired from the wheel speed sensors 11 or the rear wheel resolver 13, but may be calculated from information from other sensors.

A slip control torque calculation processing unit 103 calculates, from the vehicle speed, a slip control target wheel speed, and the driver requested torque, a driving torque limit value during acceleration or a braking torque limit value during deceleration, and calculates a slip control torque limited so that the post regenerative-cooperative-brake-reception torque is within a range of the limit value.

A torque limit processing unit 104 uses various types of torque limit values such as the battery requested torque limit value to limit the slip control torque, and outputs a post limit driving torque as a command torque. The post limit driving torque includes both of a torque on the acceleration side of the vehicle and a torque on the deceleration side of the vehicle.

Figure 3:
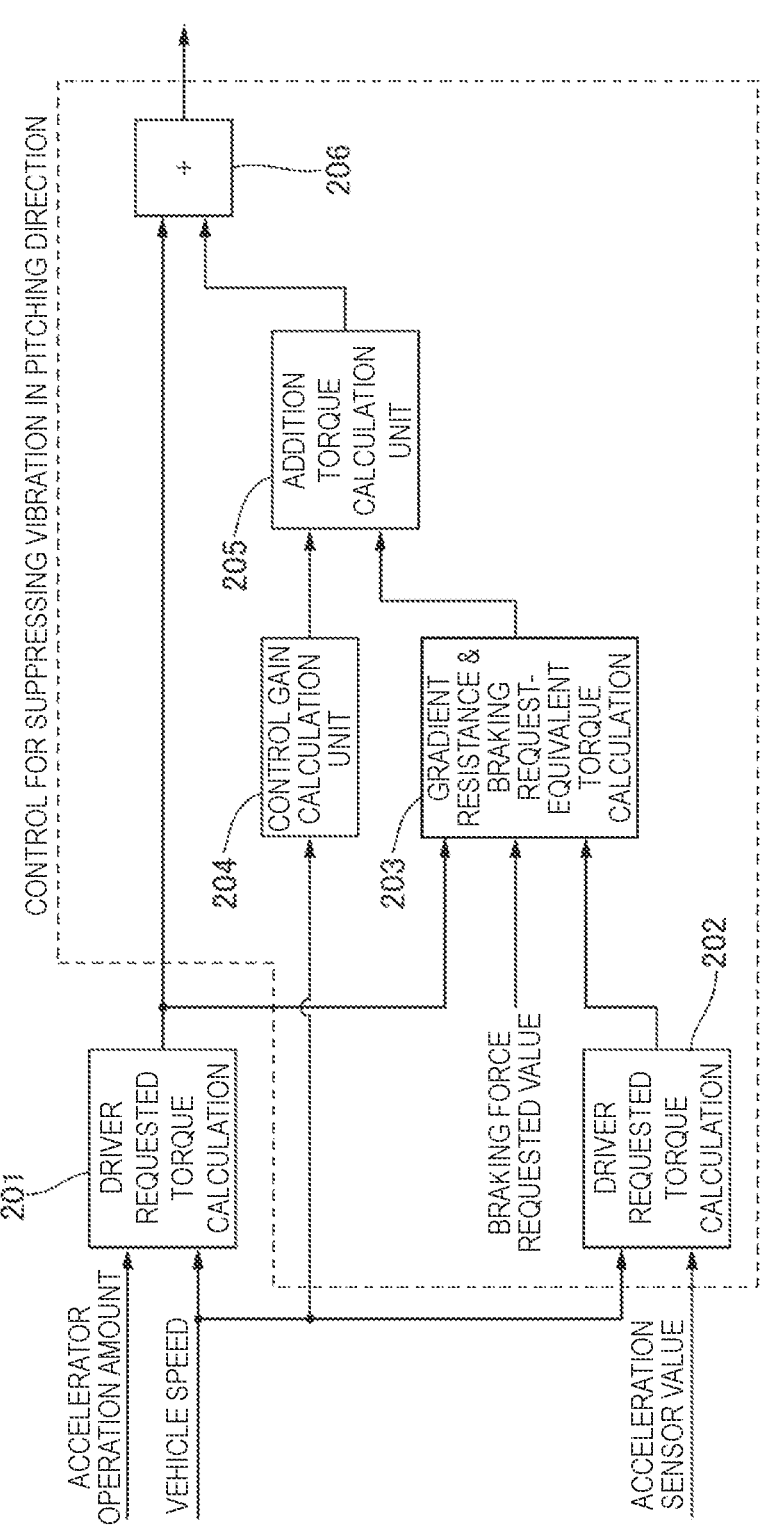
FIG. 3 is a control block diagram for illustrating details of driver requested torque calculation processing in the first embodiment.

FIG. 3 is a control block diagram for illustrating details of driver requested torque calculation processing in the first embodiment.

A driver requested torque calculation unit 201 calculates a torque requested by the driver based on an accelerator operation amount and the vehicle speed. For this calculation content, a well-known technical configuration may appropriately be employed, and the calculation content is not particularly limited.

A gradient resistance calculation unit 202 calculates, based on the vehicle speed and the acceleration being the value of the acceleration sensor 5, resistance caused by a gradient of a road surface and acting on the vehicle. Specifically, the gradient resistance calculation unit 202 executes gradient estimation from a deviation between the estimated acceleration calculated from the vehicle speed and the actual acceleration detected by the acceleration sensor 5. This estimation is executed to avoid an excessive decrease in vehicle deceleration due to a gradient of a downhill when a torque is added.

A gradient resistance & braking force request-equivalent torque calculation unit 203 executes conversion to a torque corresponding to the braking force requested value. Specifically, the gradient resistance & braking force request-equivalent torque calculation unit 203 subtracts the torque corresponding to the gradient resistance and the creep torque from the braking force request-equivalent torque value, to thereby avoid application of a torque which generates a driving force exceeding a brake braking force.

A control gain calculation unit 204 calculates both of a gain corresponding to the vehicle speed and a gain corresponding to the deceleration. Specifically, a purpose for the calculation of the gains is to change a peak gain in response to the deceleration, to thereby increase or decrease the gain in accordance with the vehicle speed at a timing corresponding to the vehicle stop.

An addition torque calculation unit 205 multiplies the braking force request-equivalent torque value by the control gain, to thereby calculate an addition torque which can suppress vibration in a pitching direction.

An addition unit 206 adds the addition torque output from the addition torque calculation unit 205 to the value output from the driver requested torque calculation unit.

Figure 4:
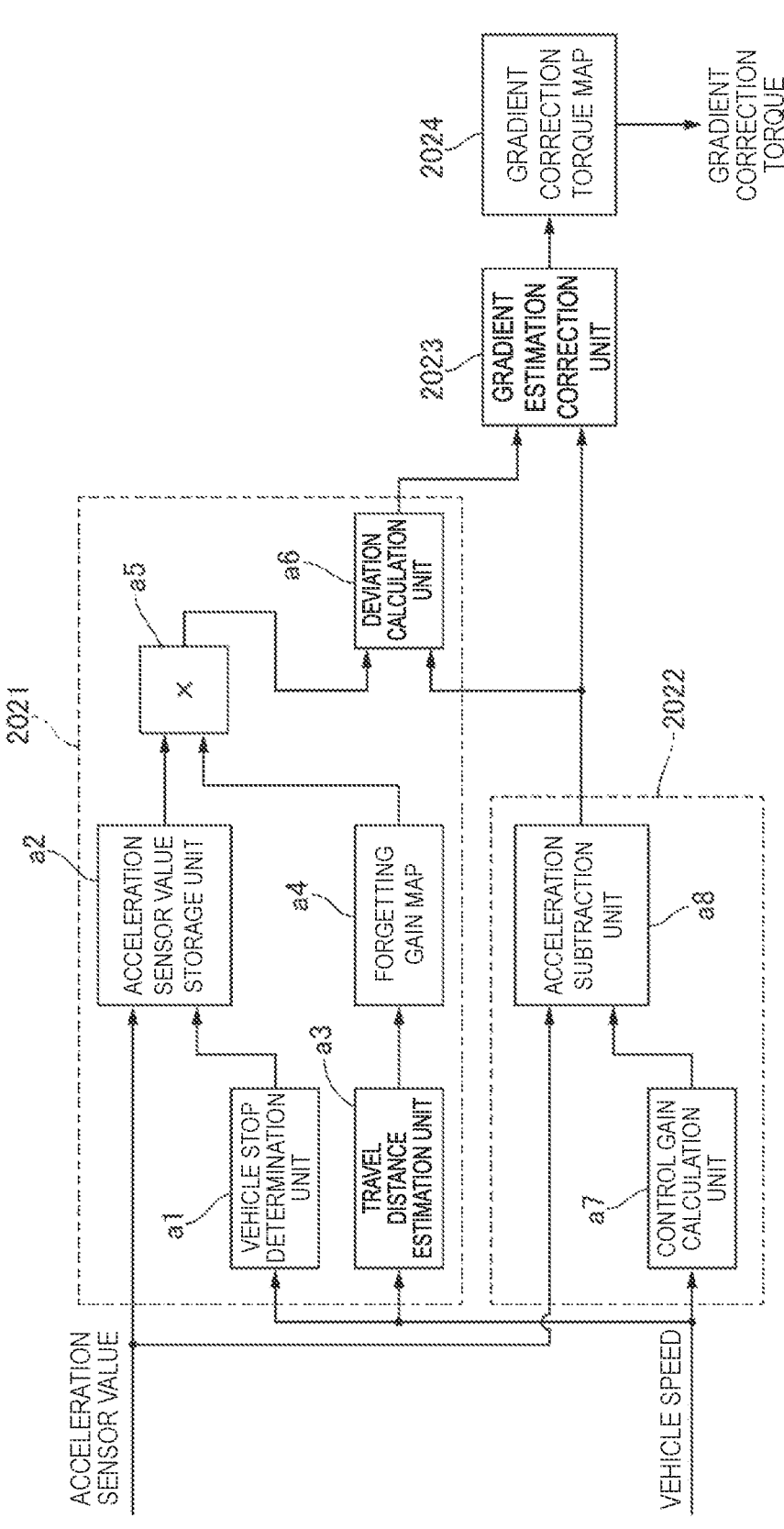
FIG. 4 is a control block diagram for illustrating details of a gradient resistance calculation unit in the first embodiment.

FIG. 4 is a control block diagram for illustrating details of the gradient resistance calculation unit 202 in the first embodiment. The gradient resistance calculation unit 202 includes a vehicle-stop-time information holding unit 2021, an actual gradient estimation unit 2022, a gradient estimation correction unit 2023, and a gradient correction torque map 2024.

The vehicle-stop-time information holding unit 2021 includes a vehicle stop determination unit a1, an acceleration sensor value storage unit a2, a travel distance estimation unit a3, a forgetting gain map a4, a multiplication unit a5, and a deviation calculation unit a6. When the vehicle travels at a low speed on a sloped road, and stops again, there is not enough time for the actual gradient estimation unit 2022 to estimate a gradient, and hence there is fear for a decrease in performance. Thus, the vehicle-stop-time information holding unit 2021 is configured for the purpose of increasing gradient estimation accuracy through use of the acceleration sensor value information for a previous stop.

The actual gradient estimation unit 2022 estimates an estimation value of an actual gradient being a current gradient based on a deviation calculated by an acceleration/deceleration subtraction unit a8. This deviation is between a value output from an acceleration/deceleration estimation unit a7 which calculates an estimated acceleration/deceleration of the vehicle calculated by differentiating the vehicle speed and the value output from the acceleration sensor 5.

FIG. 5 is a graph for showing an operation of the vehicle stop determination unit in the first embodiment. The vehicle stop determination unit a1 has a function of determining the vehicle stop when the vehicle speed has become equal to or lower than a predetermined value and a defined time has elapsed after the vehicle speed became equal to or lower than the predetermined value. A reason for waiting for the defined time is that the acceleration sensor value immediately after the vehicle stop may be oscillatory. The acceleration sensor value storage unit a2 has a function of holding the value of the acceleration sensor 5 after the vehicle stop determination unit a1 determines that the vehicle has stopped. The travel distance estimation unit a3 calculates a travel distance from a control cycle time and the vehicle speed.

FIG. 6 is the forgetting gain map provided in the vehicle-stop-time information holding unit in the first embodiment. This map shows a gain for causing the stored acceleration sensor value to be gradually forgotten in accordance with the travel distance, and the acceleration sensor value is caused to be completely forgotten when a predetermined value x1 (m) is reached. The multiplication unit a5 multiplies the stored acceleration sensor value by the forgetting gain corresponding to the travel distance, to thereby calculate an acceleration sensor value. The deviation calculation unit a6 calculates a deviation between the actual gradient estimation value calculated by the actual gradient estimation unit 2022 and a gradient held in the vehicle-stop-time information holding unit 2021.

The gradient estimation correction unit 2023 adds the value output from the deviation calculation unit a6 to the actual gradient estimation value, to thereby correct the actual gradient estimation value. FIG. 7 is the gradient correction torque map provided in the gradient resistance calculation unit in the first embodiment. For an upward slope (+), a value being corrected toward a positive side as a gradient correction torque is output as the gradient correction torque. For a downward slope (−), a value being corrected toward a negative side as the gradient correction torque is output as the gradient correction torque.

Figure 8:
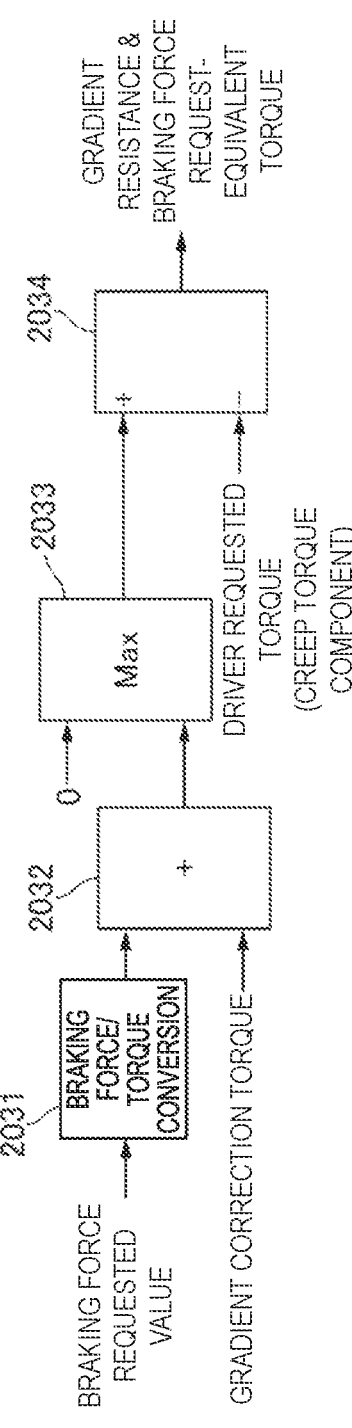
FIG. 8 is a control block diagram for illustrating details of a gradient resistance & braking force request-equivalent torque calculation unit in the first embodiment.

FIG. 8 is a control block diagram for illustrating details of the gradient resistance & braking force request-equivalent torque calculation unit in the first embodiment. The gradient resistance & braking force request-equivalent torque calculation unit 203 includes a braking force/torque conversion unit 2031, an addition unit 2032, a selection unit 2033, and a subtraction unit 2034. The braking force/torque conversion unit 2031 calculates a torque corresponding to the braking force generated by the brake operation. The addition unit 2032 adds the gradient correction torque to the torque corresponding to the braking force. The selection unit 2033 limits the torque corresponding to the braking force request to 0 so that the torque corresponding to the braking force request does not enter the positive side (acceleration side). The subtraction unit 2034 subtracts the creep torque component so that a sum of the creep torque and the addition torque does not exceed the braking force, and the vehicle deceleration does not excessively decrease due to inertia caused by the downhill when the torque is added. As a result, unintentional acceleration of the vehicle 1 is avoided.

Figure 9:
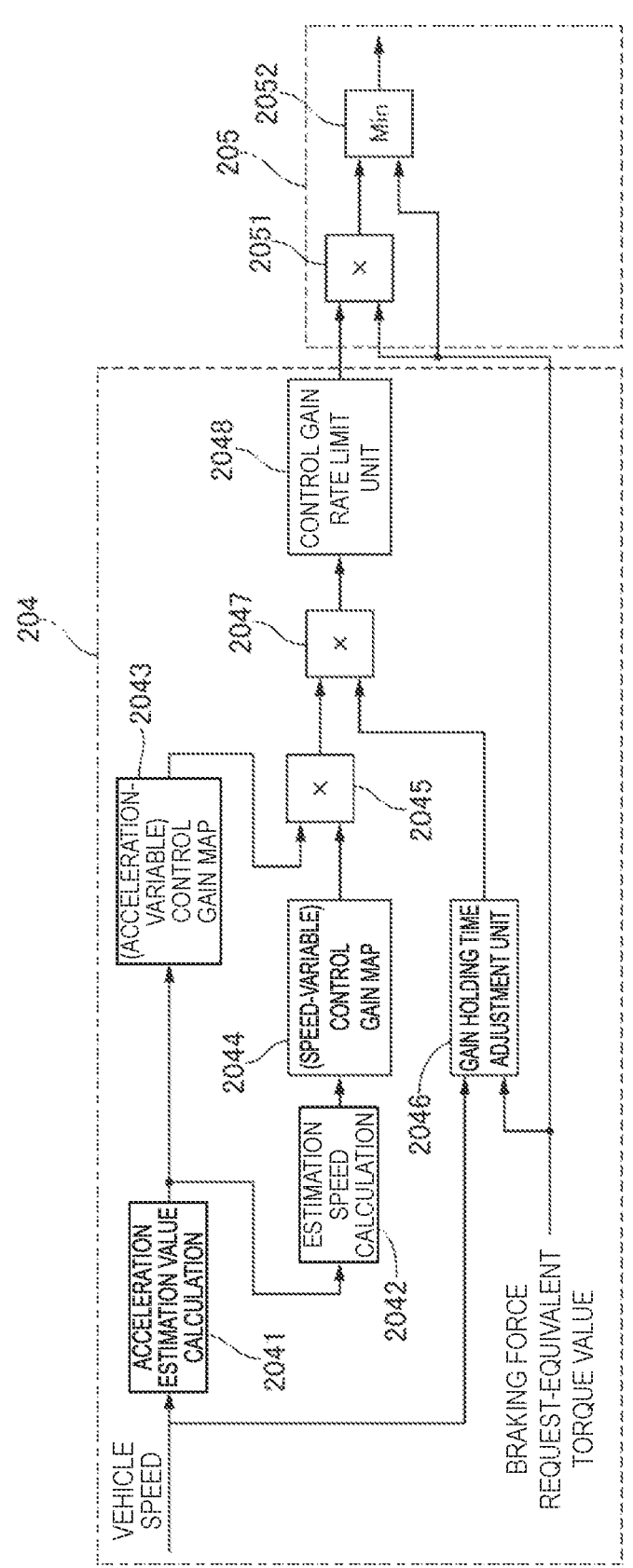
FIG. 9 is a control block diagram for illustrating details of a control gain calculation unit and an addition torque calculation unit in the first embodiment.

FIG. 9 is a control block diagram for illustrating details of the control gain calculation unit 204 and the addition torque calculation unit 205 in the first embodiment. The control gain calculation unit 204 includes an acceleration estimation value calculation unit 2041, an estimation speed calculation unit 2042, a control gain map (acceleration-variable type) 2043, a control gain map (speed-variable type) 2044, a multiplication unit 2045, a gain holding time adjustment unit 2046, a multiplication unit 2047, and a control gain rate limit unit 2048. Moreover, the addition torque calculation unit 205 includes a multiplication unit 2051 and a selection unit 2052.

Figure 10:
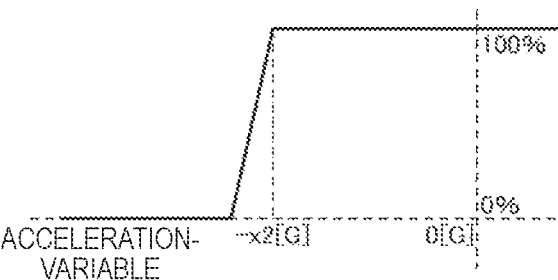
FIG. 10 shows an acceleration-variable type control gain map in the first embodiment.
Figure 11:
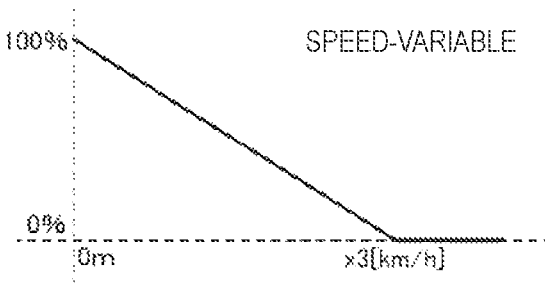
FIG. 11 shows a speed-variable type control gain map in the first embodiment.

The acceleration estimation value calculation unit 2041 calculates an estimation value of the vehicle acceleration from a derivative of the vehicle speed. FIG. 10 shows the acceleration-variable type control gain map. FIG. 11 shows the speed-variable type control gain map. The acceleration-variable type control gain map 2043 gradually reduces the gain when a deceleration having an absolute value equal to or higher than a defined value x2 (G) is generated, and sets the gain to 100% for a deceleration having an absolute value lower than the defined value x2 (G), to thereby avoid the addition of the torque when sudden braking occurs. It should be understood that securing the braking force is desired more than suppressing the vibration in the pitching direction when the sudden braking occurs. Moreover, in the speed-variable type control gain map 2044, the gain acts in a suppressing manner as the vehicle speed increases. Thus, when the vehicle speed reaches x3 (km/m), the gain is completely set to 0, and hence mainly acts immediately before the vehicle stops. The multiplication unit 2045 multiplies both of those gains by each other, to thereby cause the gain to effectively act from a time immediately before the vehicle stops when the vehicle is not suddenly decelerating.

Figure 12:
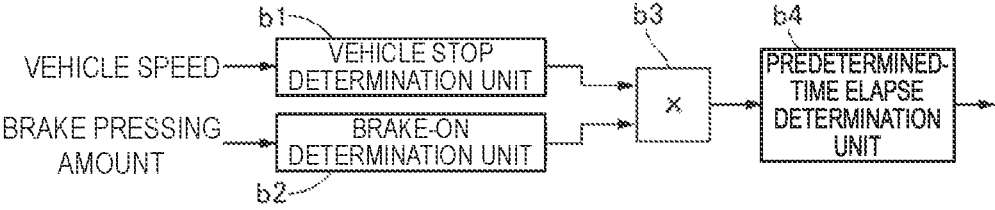
FIG. 12 is a control block diagram for illustrating details of a gain holding time adjustment unit in the first embodiment.
Figure 13:
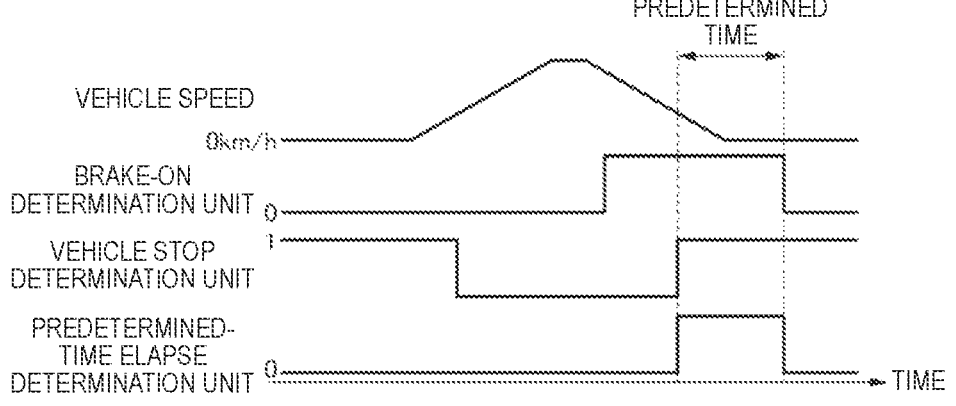
FIG. 13 is a time chart for showing an action in the gain holding time adjustment unit in the first embodiment.

FIG. 12 is a control block diagram for illustrating details of the gain holding time adjustment unit 2046. FIG. 13 is a time chart for showing an action in the gain holding time adjustment unit 2046. The gain holding time adjustment unit 2046 includes a vehicle stop determination unit b1, a brake-ON determination unit b2, a multiplication unit b3, and a predetermined-time elapse determination unit b4. The vehicle stop determination unit b1 determines whether or not the vehicle speed reaches a predetermined value for the vehicle stop determination. The vehicle stop determination unit b1 outputs 1 when the vehicle stop is determined, and outputs 0 otherwise. The brake-ON determination unit b2 outputs 1 when a brake is determined to be in an ON state in which the brake is pressed, and outputs 0 otherwise. The multiplication unit b3 outputs 1 when the brake is determined to be in the ON state and the vehicle stop is determined, and outputs 0 otherwise. The predetermined-time elapse determination unit b4 outputs 1 until a predetermined time set in advance elapses when 1 is output from the multiplication unit b3, and outputs 0 after the predetermined time has elapsed, to thereby hold the maximum value so that the gain does not decrease immediately after the vehicle stops.

Figure 14:
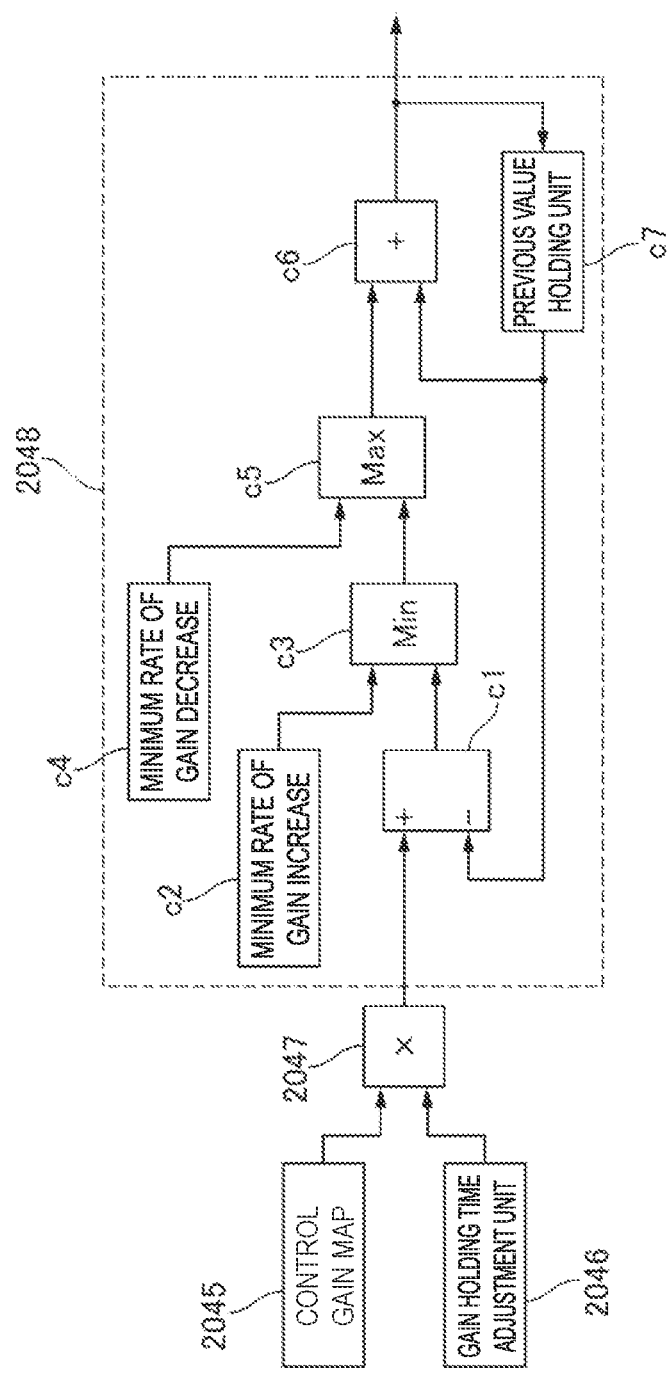
FIG. 14 is a control block diagram for illustrating details of a control gain rate limit unit in the first embodiment.

FIG. 14 is a control block diagram for illustrating details of the control gain rate limit unit 2048. The control gain rate limit unit 2048 includes a deviation calculation unit c1, a minimum-rate-of-gain-increase output unit c2, a selection unit c3, a minimum-rate-of-gain-decrease output unit c4, a selection unit c5, an addition unit c6, and a previous value holding unit c7. The deviation calculation unit c1 calculates a deviation between a gain multiplied by the multiplication unit 2047 and a limited gain. The selection unit c3 compares a value output from the minimum-rate-of-gain-increase output unit c2 and the deviation with each other, and outputs a smaller one thereof. That is, when the gain increases, a change in the gain equal to or more than the minimum rate is avoided, to thereby cause the gain to smoothly change. The selection unit c5 outputs a larger one of a value output from the minimum-rate-of-gain-decrease output unit c4 and the value output from the selection unit c3. That is, when the gain decreases, the change in the gain equal to or more than the minimum rate is avoided, to thereby cause the gain to smoothly change.

Figure 15:
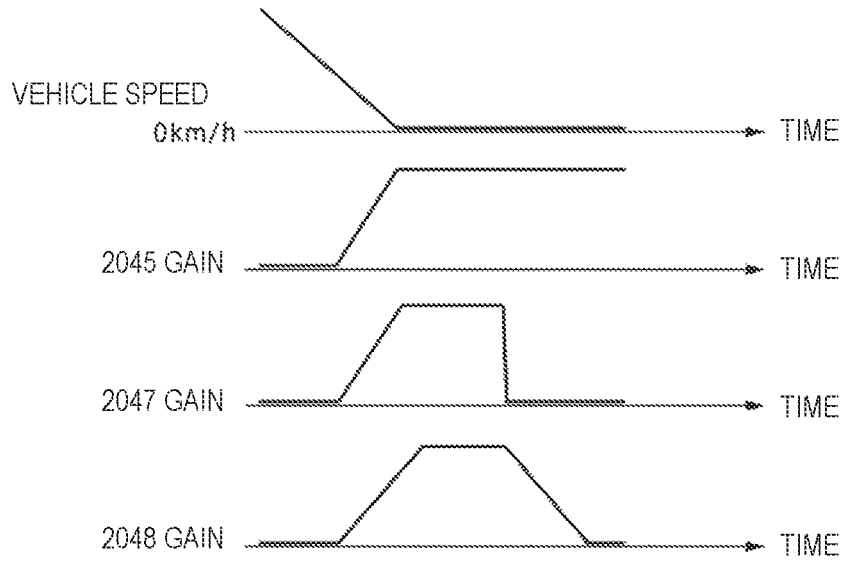
FIG. 15 is a time chart for showing a gain characteristic at the time when a vehicle speed is decreasing.

FIG. 15 is a time chart for showing a gain characteristic at the time when the vehicle speed is decreasing. The gain output from the control gain map (speed-variable type) 2045 is referred to as "2045 gain." The value obtained by multiplying the 2045 gain by the value output from the gain holding time adjustment unit 2046 is referred to as "2047 gain." The gain obtained by applying the control gain rate limit unit to the 2047 gain is referred to as "2048 gain."

When such a gain corresponding to the vehicle speed as the 2045 gain is set, the vehicle can smoothly be stopped, but the gain continues to be generated after the vehicle stop. Thus, a torque lower than the torque applied by the friction brakes 3 continues to be output from the rear motor 7 even when the vehicle is stopped, and unnecessary electric power consumption consequently occurs. Moreover, in the case of 2047 gain, the vehicle can smoothly be stopped, and the unnecessary electric power consumption can be reduced compared with the case of the 2045 gain. However, there is a fear in that occurrence of vibration and a sense of discomfort felt by the driver is caused by a sudden change in a vehicle posture, twist resonance of drive shafts, and the like due to sudden gain fluctuation after the vehicle stops. Meanwhile, when the 2048 gain is employed, the fluctuation of the gain is to be limited, and hence the gain smoothly fluctuates compared with other gains. As a result, it is possible to avoid the sudden change in the vehicle posture, the twist resonance of the drive shafts, and the like, to thereby suppress the vibration and the sense of discomfort felt by the driver.

The addition torque calculation unit 205 (see FIG. 9) includes the multiplication unit 2051 and the selection unit 2052. The multiplication unit 2051 multiplies the braking force request-equivalent torque value by the gain output from the control gain rate limit unit 2048, to thereby output a limited control gain. The selection unit 2052 compares the braking force request-equivalent torque value and the limited braking force request-equivalent torque value with each other, and outputs a smaller one thereof as the final addition torque.

Figure 16:
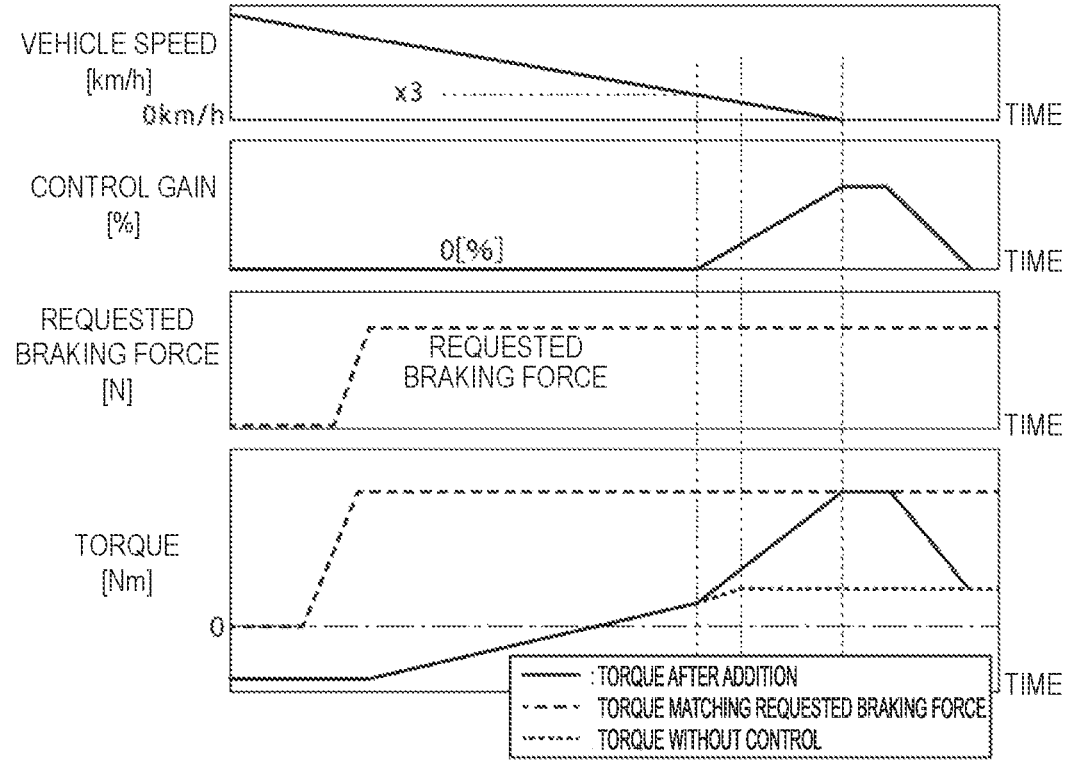
FIG. 16 is a time chart for showing a change in the vehicle speed at the time when the driver requested torque calculation processing in the first embodiment is executed.
Figure 17:
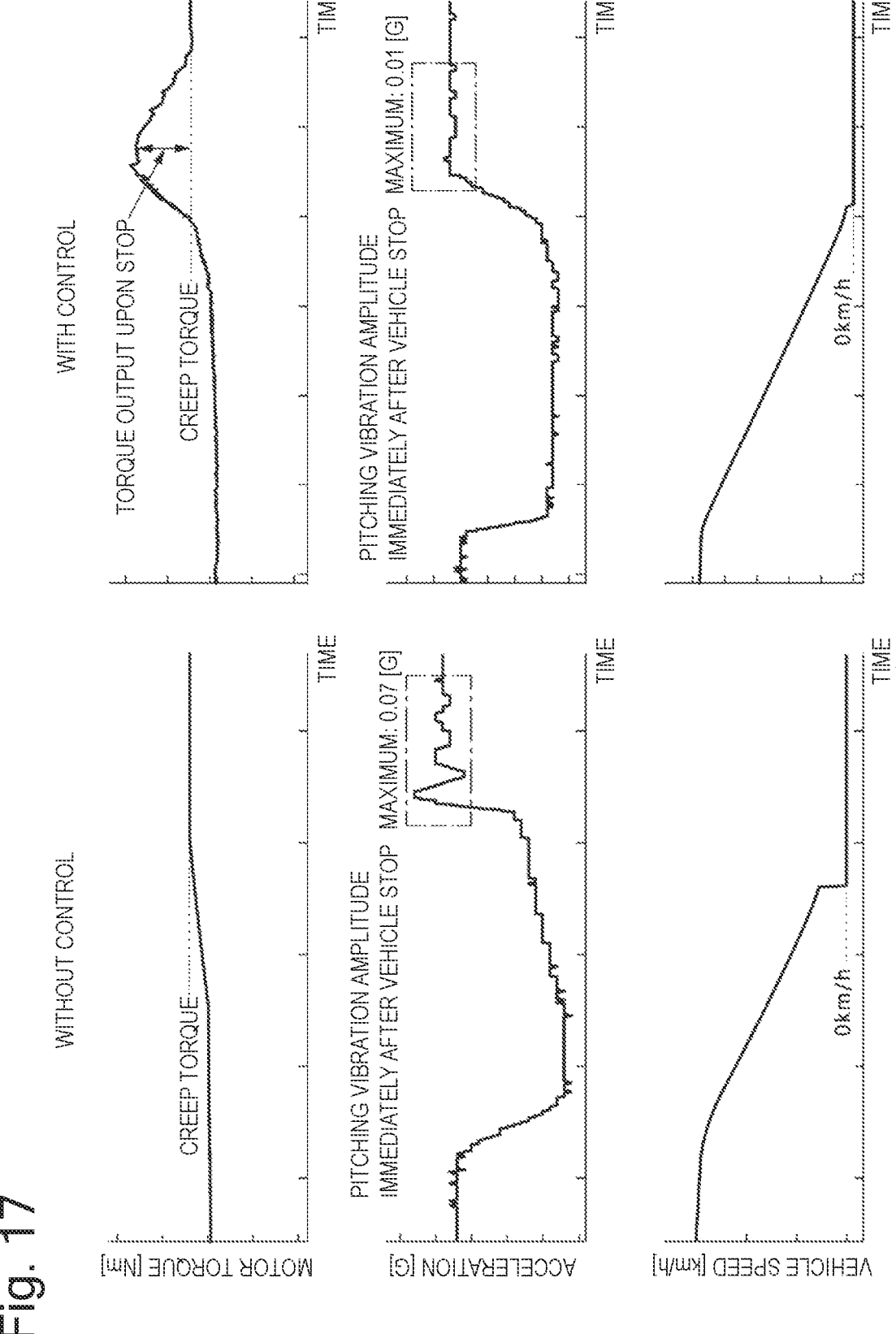
FIG. 17 is a graph for showing experimental results at the time when this control was applied to an actual vehicle and experimental results at the time when this control was not applied to an actual vehicle.

FIG. 16 is a time chart for showing a change in the vehicle speed at the time when the driver requested torque calculation processing in the first embodiment is executed. FIG. 17 is a graph for showing experimental results at the time when this control was applied to an actual vehicle and experimental results at the time when this control was not applied to an actual vehicle. The dotted line in a field for a torque of FIG. 16 represents a torque matching the requested braking force. The one-dot chain line represents a torque in a case without control in which the driver requested torque calculation processing is not executed. The solid line represents the torque after the addition.

That is, when the vehicle stops under a state in which the driver is pressing a brake pedal, the requested braking force as the driver requested torque is calculated based on the pressing state of the brake pedal by the driver. Thus, a braking force equal to or higher than the braking force required for the stop of the vehicle continues to be applied by the friction brakes 3. As a result, a friction coefficient of each of the friction brakes 3 suddenly switches from a dynamic friction coefficient to a static friction coefficient immediately before the vehicle stops, and hence the vehicle speed is liable to decrease suddenly, which is liable to induce a sudden change in acceleration (see an inside of a rectangular frame in an acceleration field indicated by "without control" of FIG. 17).

The peak gain is increased or decreased at the timing corresponding to the vehicle stop, and the output torque from the rear motor 7 is added without changing the braking force by the friction brakes 3, to thereby add the torque on the driving side within a range equal to or lower than the torque at which the friction brakes 3 obstruct the rotations of the rear wheels 2RR and 2RL. As a result, the acceleration change acting on the vehicle can be suppressed while the braking forces of the friction brakes 3 are secured (see an inside of a rectangular frame in an acceleration field indicated by "with control" of FIG. 17).

It is conceivable to change the braking torque on the friction brake 3 side, but, in this case, the friction forces are used, and hence there is a limit in responsiveness of mechanical inertia. Further, it is difficult to secure control accuracy due to influence of a variation in friction coefficient of the brake pads and the like. Meanwhile, the torque fluctuation due to the change in the friction coefficient of the friction brakes 3 and the like can be suppressed by adding the output torque from the rear motor 7 while the braking torque by the friction brakes 3 is secured, and hence the pitching vibration at the time when the vehicle stops can effectively be suppressed.

The electric vehicle control device, the electric vehicle control method, and the electric vehicle control system according to the first embodiment provide actions and effects listed below.

(1) A vehicle control device, which is provided in a vehicle 1 including friction brakes 3 (friction braking device) configured to generate a friction braking force in the vehicle 1 and a rear motor 7 (driving device) configured to generate a driving force in the vehicle 1, the vehicle control device including a vehicle control device 17 (control unit) configured to output a result of calculation based on input information, wherein the vehicle control device 17 is configured to:

acquire a physical quantity relating to a speed of the vehicle 1;

acquire a physical quantity relating to a requested braking force required to decelerate the vehicle 1; and output a control command for generating the driving force by the rear motor 7 under a state in which the friction braking force is being generated w % ben the vehicle 1 is to be decelerated based on the physical quantity relating to the requested braking force.

Thus, the sudden change in vehicle acceleration due to the friction braking force can be suppressed, and the pitching fluctuation at the time when the vehicle stops can be suppressed.

(2) The vehicle control device 17 is configured to output the control command when the physical quantity relating to the speed falls below a predetermined speed. Thus, addition of an unnecessary torque can be avoided under a usual deceleration state other than that for the vehicle stop.

(3) The vehicle control device 17 is configured to output the control command so that the driving force increases as the physical quantity relating to the speed decreases and a physical quantity relating to a deceleration of the vehicle 1 decreases. Thus, the driving force can effectively be generated immediately before the vehicle stops when the vehicle is not suddenly decelerating.

(4) The vehicle control device 17 is configured to output the control command so that a maximum value of the driving force is held until a predetermined time elapses after the vehicle 1 is determined to have stopped. Thus, it is possible to prevent the sudden change in the torques acting on the driving wheels after the vehicle stops.

(5) The vehicle control device 17 is configured to output the control command so that the driving force gradually decreases after the maximum value of the driving force is held. Thus, it is possible to avoid the sudden change in the vehicle posture, the twist resonance of the drive shafts, and the like, thereby being capable of suppressing the vibration and the sense of discomfort felt by the driver.

(6) The vehicle control device 17 is configured to output the control command so that a sum of the driving force and a force caused by a creep phenomenon occurring in the vehicle 1 is prevented from exceeding the friction braking force. Thus, unintentional acceleration of the vehicle 1 can be avoided.

(7) The vehicle control device 17 is configured to output the control command so that the driving force decreases as a road surface gradient increases in a downward direction when the vehicle 1 is being decelerated. Thus, it is possible to avoid the generation of the torque on the acceleration side due to influence of the road surface.

(8) The vehicle control device 17 is configured to estimate the road surface gradient based on a difference between a derivative of the physical quantity relating to the vehicle speed and a sensor value acquired from an acceleration sensor. Thus, the road surface gradient can accurately be estimated.

(9) The vehicle control device 17 is configured to estimate the road surface gradient based on the difference between the derivative of the physical quantity relating to the vehicle speed and the sensor value acquired from the acceleration sensor and on a value acquired from the acceleration sensor and stored when the vehicle 1 has stopped at the road surface gradient. That is, w % ben the vehicle travels at a low speed on a sloped road, and stops again, there is not enough time to estimate a gradient, and hence there is fear for a decrease in performance. Thus, the gradient estimation accuracy can be increased through use of the acceleration sensor value information for the previous stop.

(10) In the first embodiment, the rear motor 7 being an electric motor is provided as the driving device. Thus, the driving force can be controlled while high control accuracy and responsiveness are achieved, thereby being capable of effectively suppressing the pitching fluctuation at the time when the vehicle stops.

Other Embodiments

The embodiment of the present invention has been described above. However, the specific configuration of the present invention is not limited to the configuration described in the embodiment. A modification in design without departing from the scope of the gist of the invention is also encompassed in the present invention.

For example, in this embodiment, the configuration of the present invention is applied to the rear-wheel-drive electric vehicle, but may be applied to a front-wheel-drive electric vehicle or a four-wheel-drive electric vehicle. Moreover, the vehicle is not limited to the electric vehicle, and may be a vehicle including an engine which is an internal combustion engine or a hybrid vehicle which can travel through use of both an engine and a motor. That is, it is only required to have a configuration in which the torque can be added from a drive source side within a range in which the vehicle can stop or within a range in which the braking forces act between the driving wheels and the road surface when the vehicle stops through use of the friction brakes.

Technical Idea Understandable from Embodiment

Description is now given of the technical idea (or technical solution; the same applies hereinafter) understandable from the embodiment described above.

(1) In one aspect of the technical idea, there is provided a vehicle control device, which is provided in a vehicle including a friction braking device configured to generate a friction braking force in the vehicle and a driving device configured to generate a driving force in the vehicle, the vehicle control device including a control unit configured to output a result of calculation based on input information.

wherein the control unit is configured to:

acquire a physical quantity relating to a speed of the vehicle;

acquire a physical quantity relating to a requested braking force required to decelerate the vehicle; and output a control command for generating the driving force by the driving device under a state in which the friction braking force is being generated when the vehicle is to be decelerated based on the physical quantity relating to the requested braking force.

(2) In a more preferred aspect, in the above-mentioned aspect, the control unit is configured to output the control command when the physical quantity relating to the speed falls below a predetermined speed.

(3) In another preferred aspect, in any one of the above-mentioned aspects, the control unit is configured to output the control command so that the driving force increases as the physical quantity relating to the speed decreases and a physical quantity relating to a deceleration of the vehicle decreases.

(4) In still another preferred aspect, in any one of the above-mentioned aspects, the control unit is configured to output the control command so that a maximum value of the driving force is held until a predetermined time elapses after the vehicle is determined to have stopped.

(5) In yet another preferred aspect, in any one of the above-mentioned aspects, the control unit is configured to output the control command so that the driving force gradually decreases after the maximum value of the driving force is held.

(6) In yet another preferred aspect, in any one of the above-mentioned aspects, the control unit is configured to output the control command so that a sum of the driving force and a force caused by a creep phenomenon occurring in the vehicle is prevented from exceeding the friction braking force.

(7) In yet another preferred aspect, in any one of the above-mentioned aspects, the control unit is configured to output the control command so that the driving force decreases as a road surface gradient increases in a downward direction when the vehicle is being decelerated.

(8) In yet another preferred aspect, in any one of the above-mentioned aspects, the control unit is configured to estimate the road surface gradient based on a difference between a derivative of the physical quantity relating to the vehicle speed and a sensor value acquired from an acceleration sensor configured to detect an acceleration of the vehicle.

(9) In yet another preferred aspect, in any one of the above-mentioned aspects, the control unit is configured to estimate the road surface gradient based on the difference between the derivative of the physical quantity relating to the vehicle speed and the sensor value acquired from the acceleration sensor and on a value acquired from the acceleration sensor and stored when the vehicle has stopped at the road surface gradient.

(10) In yet another preferred aspect, in any one of the above-mentioned aspects, the driving device is an electric motor.

(11) Further, from another viewpoint, in one aspect of the technical idea, there is provided a vehicle control method of controlling a vehicle including a friction braking device configured to generate a friction braking force in the vehicle and a driving device configured to generate a driving force in the vehicle, the vehicle control method including:

acquiring a physical quantity relating to a speed of the vehicle;

acquiring a physical quantity relating to a requested braking force required to decelerate the vehicle; and outputting a control command for generating the driving force by the driving device under a state in which the friction braking force is being generated when the vehicle is to be decelerated based on the physical quantity relating to the requested braking force.

(12) Further, from still another viewpoint, in one aspect of the technical idea, there is provided a vehicle control system, including:

a friction braking device configured to generate a friction braking force in a vehicle;

a driving device configured to generate a driving force in the vehicle; and a control device configured to output a result of calculation based on input information, wherein the control device is configured to:

acquire a physical quantity relating to a speed of the vehicle;

acquire a physical quantity relating to a requested braking force required to decelerate the vehicle; and output a control command for generating the driving force by the driving device under a state in which the friction braking force is being generated when the vehicle is to be decelerated based on the physical quantity relating to the requested braking force.

Note that, the present invention is not limited to the above-mentioned embodiment, and includes further various modification examples. For example, in the above-mentioned embodiment, the configurations are described in detail in order to clearly describe the present invention, but the present invention is not necessarily limited to an embodiment that includes all the configurations that have been described. Further, a part of the configuration of a given embodiment can replace the configuration of another embodiment, and the configuration of another embodiment can also be added to the configuration of a given embodiment. Further, another configuration can be added to, deleted from, and replace a part of the configuration of each of the embodiments.

The present application claims a priority based on Japanese Patent Application No. 2020-164411 filed on Sep. 30, 2020. All disclosed contents including Specification, Scope of Claims, Drawings, and Abstract of Japanese Patent Application No. 2020-164411 filed on Sep. 30, 2020 are incorporated herein by reference in their entirety.

REFERENCE SIGNS LIST

1 electric vehicle
2RL, 2RR rear wheel
3 friction brake
5 acceleration sensor
7 rear motor
11 wheel speed sensor
13 rear wheel resolver
17 vehicle control device
18 brake control device
20 rear motor control device
22 accelerator pedal sensor
23 brake sensor

The invention claimed is:

1. A vehicle control device, which is configured to be provided in a vehicle including a friction brake configured to generate a friction braking force in the vehicle and a motor configured to generate a driving force in the vehicle, the vehicle control device comprising:

a controller configured to output a result of calculation based on input information, wherein the controller is configured to:

acquire a first physical quantity relating to a speed of the vehicle;

acquire a second physical quantity relating to a requested braking force required to stop the vehicle;

estimate a road surface gradient based on: (i) a difference between a derivative of the first physical quantity and a sensor value acquired from an acceleration sensor configured to detect an acceleration of the vehicle; and (ii) another value acquired from the acceleration sensor and stored when the vehicle has stopped at the road surface gradient; and output a control command for generating the driving force by the motor, immediately before the vehicle stops, under a state in which the friction braking force based on the second physical quantity is being generated, so that the driving force decreases as the road surface gradient increases in a downward direction when the vehicle is being decelerated.

2. The vehicle control device according to claim 1, wherein the controller is configured to output the control command when the first physical quantity falls below a predetermined speed.

3. The vehicle control device according to claim 2, wherein the controller is configured to output the control command so that the driving force increases as the first physical quantity decreases and a third physical quantity relating to a deceleration of the vehicle decreases.

4. The vehicle control device according to claim 3, wherein the controller is configured to output the control command so that a maximum value of the driving force is held until a predetermined time elapses after the vehicle is determined to have stopped.

5. The vehicle control device according to claim 4, wherein the controller is configured to output the control command so that the driving force decreases after the maximum value of the driving force is held.

6. The vehicle control device according to claim 2, wherein the controller is configured to output the control command so that a maximum value of the driving force is held until a predetermined time elapses after the vehicle is determined to have stopped.

7. The vehicle control device according to claim 2, wherein the controller is configured to output the control command so that the driving force decreases after a maximum value of the driving force is held.

8. The vehicle control device according to claim 2, wherein the controller is configured to output the control command so that a sum of the driving force and a force caused by a creep phenomenon occurring in the vehicle is prevented from exceeding the friction braking force.

9. The vehicle control device according to claim 1, wherein the motor is an electric motor.

10. A vehicle control method of controlling a vehicle including a friction brake configured to generate a friction braking force in the vehicle and a motor configured to generate a driving force in the vehicle, the vehicle control method comprising:

acquiring a first physical quantity relating to a speed of the vehicle;

acquiring a second physical quantity relating to a requested braking force required to stop the vehicle;

estimating a road surface gradient based on: (i) a difference between a derivative of the first physical quantity and a sensor value acquired from an acceleration sensor configured to detect an acceleration of the vehicle; and (ii) another value acquired from the acceleration sensor and stored when the vehicle has stopped at the road surface gradient; and outputting a control command for generating the driving force by the motor, immediately before the vehicle stops, under a state in which the friction braking force based on the second physical quantity is being generated, so that the driving force decreases as the road surface gradient increases in a downward direction when the vehicle is being decelerated.

11. A vehicle control system, comprising:

a friction brake configured to generate a friction braking force in a vehicle;

a motor configured to generate a driving force in the vehicle; and a controller configured to output a result of calculation based on input information, wherein the controller is configured to:

acquire a first physical quantity relating to a speed of the vehicle;

acquire a second physical quantity relating to a requested braking force required to stop the vehicle;

estimate a road surface gradient based on: (i) a difference between a derivative of the first physical quantity and a sensor value acquired from an acceleration sensor configured to detect an acceleration of the vehicle; and (ii) another value acquired from the acceleration sensor and stored when the vehicle has stopped at the road surface gradient; and output a control command for generating the driving force by the motor, immediately before the vehicle stops, under a state in which the friction braking force based on the second physical quantity is being generated, so that the driving force decreases as the road surface gradient increases in a downward direction when the vehicle is being decelerated.

12. The vehicle control device according to claim 5, wherein the controller is configured to output the control command so that the driving force decreases at a constant rate after the maximum value of the driving force is held.

13. The vehicle control device according to claim 7, wherein the controller is configured to output the control command so that the driving force decreases at a constant rate after the maximum value of the driving force is held.

* * * * *